June 5, 1962  E. A. MEYER  3,037,595
PINCHWELD CLIP
Original Filed Oct. 6, 1959
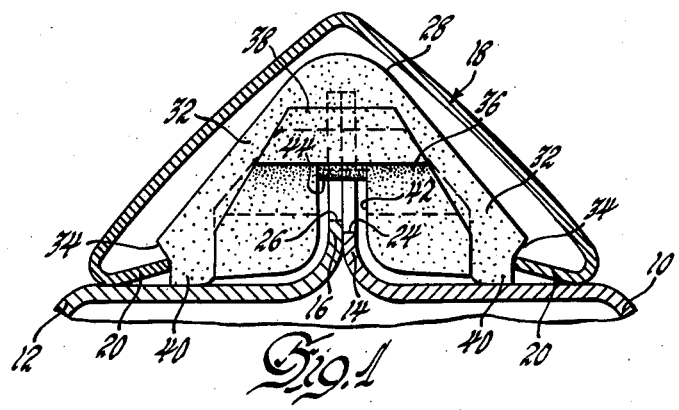
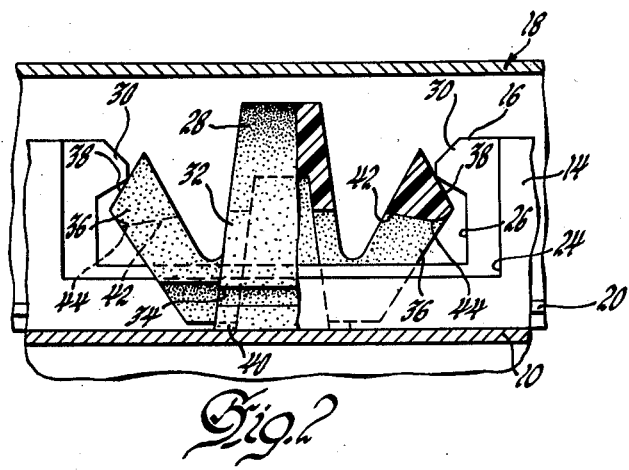
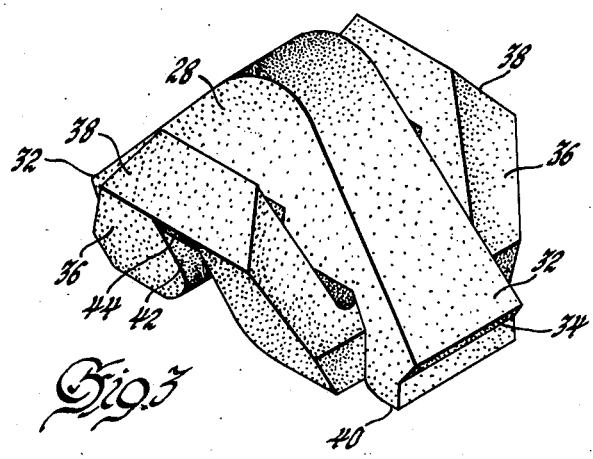
INVENTOR.
Engelbert A. Meyer
BY
E. W. Christen
ATTORNEY United States Patent Office 3,037,595
Patented June 5, 1962

3,037,595
PINCHWELD CLIP
Engelbert A. Meyer, Pontiac, Mich., assignor to General Motors Corporation, Detroit, Mich., a corporation of Delaware
Original application Oct. 6, 1959, Ser. No. 844,735. Divided and this application July 18, 1960, Ser. No. 43,528
5 Claims. (Cl. 189—88)

This invention relates to fasteners and more particularly to a fastener for retaining a chrome molding strip over a pinchweld connection between a pair of panel members. This is a division of copending application Serial No. 844,735, filed October 6, 1959, in the name of Engelbert A. Meyer.

In motor vehicle manufacture it is becoming increasingly popular to employ pinchweld flange connections between various panel members. This type of connection is formed by a flange, bent at approximately 90° with respect to the body of the panel member, and abutting a similarly formed flange in the adjoining piece. The two flanges are then spot welded, seam welded or joined in some other convenient fashion, rigidly securing the two panel members together with an upstanding double flange that must be covered in order to enhance the aesthetic appeal of the vehicle. A typical pinchweld flange connection may generally be found between a rear quarter panel of a motor vehicle where it is connected along the top to the upper quarter panel extension, extending between the trunk lid and the peak of the quarter panel.

The general method of covering the pinchweld flange in motor vehicle manufacture is to use a chrome molding strip of substantially U-shaped cross-section, the molding strip extending along the length of the pinchweld flange. The requires some means for retaining the molding strip over the flange in a manner preventing vibrations, bumps and the like from jarring the chrome strip loose. Fastener devices utilized in the past have been designed according to the design of the parts to be secured and usually comprise a large number of tabs and tongues formed at many different angles with respect to the body of the clip. These present numerous installation problems, such as the twisting of various tabs on installation which flatten out the chrome strip and present an unseemly appearance. It is usually found that the greater the number of tabs, tongues and so forth, that are provided on a particular fastener greatly increases the amount of assembly time and greatly complicates the assembly operation.

A further disadvantage that may be found in generally known pinchweld fasteners results from a slight amount of misalignment between the panels to be joined, due to manufacturing tolerances and the like. With the well known types of pinchweld fasteners, the installation of the fastener and the chrome strip generally results in a deformed structure presenting again an unsightly appearance.

The device in which this invention is embodied comprises generally, a fastener having legs and tongues extending only from the four sides of the body of the clip and being easily secured in an opening formed in the pinchweld flange. The legs are so formed that the installation of the fastener in the pinchweld flange is extremely simple, requires no special tools, and it is extremely difficult to deform or insert the fastener in an improper position. With the fastener in place, it is necessary only to snap the chrome strip over the tongues of the fastener to securely retain the chrome strip over the pinchweld flange. A plurality of nubs or depressions are formed in the fastener to present only a small amount of area in actual contact with the panel members, in order to compensate for misalignment of the various panels and keep the appearance of the chrome strip satisfactory even though the panels may be misaligned.

The fastener structure provides a more positive means of retention than heretofore available, as well as ease in installation and the economic advantage resulting therefrom.

These and other advantages will become more apparent from the following descriptions and drawings in which:

FIGURE 1 is an end view of a molding installation embodying the proposed fastener device, with parts broken away and in section to illustrate the positions of the various parts.

FIGURE 2 is an elevational view of the molding installation illustrated in FIGURE 1, with parts broken away and in section to illustrate the location of the various parts.

FIGURE 3 is an isometric view of the fastening device illustrated in FIGURES 1 and 2.

Referring more particularly to the drawings, the fastening device may be formed of a plastic material, such as nylon or the like, which retains a certain amount of resiliency but enough rigidity to securely maintain itself in the pinchweld flange and secure the molding strip thereover. In FIGURE 1, a supporting panel 10, which may be a quarter panel, and panel 12, which may be a quarter panel extenson, are shown having flanges 14 and 16 respectively, forming the pinchweld connection.

The molding strip 18, of generally U-shaped cross section and having flanges 20 extending inwardly at the top of the legs of the U, is retained over the pinchweld flange by a fastener, illustrated generally by the numeral 22. An opening or slot 24 is formed in the flange 14 of the quarter panel 10 and a similar opening or slot 26 is formed in the flange 16 of the quarter panel extension 12. These slots may be of the same size and configuration, or may be of different sizes and configurations as illustrated in the drawings. The advantages realized in the different sizes and configurations lies in the fact that manufacturing tolerances need not be maintained in order to exactly position the two parts so that the slots are aligned on assembly. The fastener 22 is received in the opening formed by the slots to present as low an outline as possible, permitting a conveniently small molding strip.

The fastener 22 comprises generally a body 28, disposed in the opening formed by slots 24 and 26 formed in the quarter panel flange 14 and the upper panel extension flange 16, respectively. The slot 26 may have extensions 30 formed in either side thereof to provide more positive retention means of the fastener structure. Such a construction is preferred in order to positively prevent any unauthorized removal of the fastener from the pinchweld flange.

Extending from the body 28 are a pair of tongues 32 which are disposed in a downward and outward direction. A groove, or depression, 34 is formed in the end of each tongue to receive the flange 20 of the molding strip 18.

A pair of legs 36 extend from the body 28 in a generally U-shaped manner, the outward ends of the legs 36 having inclined surfaces 38 adapted to abut the extension 30 of the flange 16 in the rear quarter panel extension. The extensions 30 engage inclined surfaces 38 to rigidly secure the legs 36 and the fastener in the pinchweld flange, and may be chamfered at their upper corners to assist the entry of the fastener.

In order to space the fastener from the panel members and to compensate for misalignment of the panel members 10 and 12, the tongues have extensions 40 abutting the panels and spacing the fastener therefrom. The contact between the fastener and the panel members is thus decreased to a minimum, permitting the fastener to tilt one way or the other with misalignment of the panel members. A slot 42 formed in the legs 36 overrides the portions of the pinchweld flange below the lower edges of the slots 24 and 26. Slot 42 has an upper curved surface 44 which aids in inserting the clip in the flange 16.

The installation of the fastener modification illustrated in FIGURES 1 through 3 is as follows: The fastener is forced between the extensions 30 of the flange 16, the curved surface 44 and chamfer in the extension 30 allowing the fastener to easily slide into position, until the nubs or extensions 40 contact the panel members 10 and 12. In so doing, the inclined surfaces 38 will partially ride over the extensions 30 and will wedge the fastener into position between these extensions. Removal of the fastener can only be accomplished by bending the legs 36 inwardly toward the body 28 of the fastener to clear the inclined surfaces 38 from the extensions 30. The fastener is thus secured in the pinchweld flange. When the chrome strip 18 is to be mounted over the pinchweld flange, it is placed such that the flanges 20 of the chrome strip 18 overlie the surfaces of the tongues 32. The chrome strip is then snapped into the grooves 34 formed in the ends of the tongues, thus securing the molding strip in the fastener and in its proper position over the pinchweld flange.

It may be seen that a fastener structure is provided for rigidly securing a chrome strip over a pinchweld flange with a minimum of effort and maximum positive securement. There are no tabs or tongues associated with the fastener that can be deformed or bent out of shape by the operator installing the fasteners, thus preserving the aesthetic value of the chrome strip over the pinchweld flange.

What is claimed:

1. A fastener for securing a molding strip of substantially U-shaped cross section over a pinchweld flange connection between two panel members and comprising a body receivable in an opening formed in said pinchweld flange, a tongue extending from each side of said body and engaging the inturned edges of said molding strip, a leg extending from each end of said body and engaging the edges of the opening in said pinchweld flange for securing said fastener and said molding strip therein, and means spacing said body and said tongues and said legs from said panels for permitting securement of said fastener and said molding strip in said pinchweld flange under conditions of misalignment of said panels forming said pinchweld flange.

2. A plastic fastener for securing a molding strip of substantially U-shaped cross section over a pinchweld flange connection between two panel members and comprising a body receivable in an opening formed in said pinchweld flange, a tongue extending from each side of said body and engaging the inturned edges of said molding strip, a leg extending from each end of said body and engaging the edges of the opening in said pinchweld flange for securing said fastener and said molding strip therein, and means spacing said body and said tongues and said legs from said panels for permitting securement of said fastener and said molding strip in said pinchweld flange under conditions of misalignment of said panels forming said pinchweld flange.

3. A fastener for securing a molding of substantially U-shaped cross section over a pinchweld flange connection between two panel members and comprising a body disposed in an opening in said pinchweld flange, a tongue extending from each side of said body, a lip formed at the outer end of each of said tongues for engaging the inturned edges of said molding strip, a U-shaped leg extending from each end of said body and having the outward portion thereof resiliently biased toward the edge of the opening in said pinchweld flange, a tab struck outwardly from said outer portion of said leg for engaging the edge of the opening in said pinchweld flange and securing said fastener therein, and a pair of nubs struck downwardly from the base of said U-shaped leg for engaging said panels and spacing said fastener therefrom and compensating for misalignment of said panels connected by said pinchweld flange.

4. A fastener for securing a molding strip of substantially U-shaped cross section over a pinchweld flange connection between two panel members and comprising a body disposed in an opening in said pinchweld flange, a tongue extending from each side of said body and toward said panel members and having a groove formed in the end thereof, said grooves being formed to engage the innermost edges of said molding strip to prevent movement of said molding strip away from said panel members, a leg extending from each end of said body and having an inclined surface formed at the end thereof, said inclined surface being engageable with the edge of the opening in said pinchweld flange for wedging said fastener in said pinchweld flange and securing said fastener and said molding strip in place.

5. A fastener for securing a molding strip of substantially U-shaped cross section over a pinchweld flange connection between two panel members and comprising a body disposed in an opening in said pinchweld flange, a tongue extending from each side of said body and toward said panel members and having a groove formed in the end thereof, said grooves being formed to engage the innermost edges of said molding strip to prevent movement of said molding strip away from said panel members, a leg extending from each end of said body and having an inclined surface formed at the end thereof, said inclined surface being engageable with the edge of the opening in said pinchweld flange for wedging said fastener in said pinchweld flange and securing said fastener and said molding strip in place, said tongues each having a downwardly depending portion engaging said panel members for spacing said fastener therefrom and to compensate for misaligned conditions of said panel members forming said pinchweld flange.

References Cited in the file of this patent
UNITED STATES PATENTS
2,963,133    MacCallum _____ Dec. 6, 1960